US009213568B2

(12) United States Patent
Huang et al.

(10) Patent No.: US 9,213,568 B2
(45) Date of Patent: Dec. 15, 2015

(54) ASSIGNING STATES TO CLOUD RESOURCES

(76) Inventors: Alex Huang, Cupertino, CA (US);
Chiradeep Vittal, Cupertion, CA (US);
William Chan, Santa Clara, CA (US)

( * ) Notice: Subject to any disclaimer, the term of this patent is extended or adjusted under 35 U.S.C. 154(b) by 916 days.

(21) Appl. No.: 13/409,751

(22) Filed: Mar. 1, 2012

(65) Prior Publication Data
US 2013/0232252 A1     Sep. 5, 2013

(51) Int. Cl.
| G06F 15/173 | (2006.01) |
| G06F 9/455 | (2006.01) |
| G06F 9/50 | (2006.01) |
| G06F 11/34 | (2006.01) |
| G06F 9/38 | (2006.01) |
| G06F 11/07 | (2006.01) |

(52) U.S. Cl.
CPC .......... *G06F 9/45558* (2013.01); *G06F 9/3891* (2013.01); *G06F 9/5077* (2013.01); *G06F 11/0709* (2013.01); *G06F 11/3433* (2013.01)

(58) Field of Classification Search
CPC .............. G06F 9/5077; G06F 9/45558; G06F 11/0709; G06F 11/3433; G06F 9/3891; H04L 67/1029
USPC ........................................................ 709/224
See application file for complete search history.

(56) References Cited

U.S. PATENT DOCUMENTS

| 2009/0276771 A1* | 11/2009 | Nickolov et al. ............. 717/177 |
| 2011/0072486 A1 | 3/2011 | Hadar et al. |
| 2011/0289198 A1* | 11/2011 | Isaacson et al. ............. 709/221 |
| 2013/0031136 A1* | 1/2013 | Shah ............................. 707/783 |

OTHER PUBLICATIONS

Cloud.com—CloudStack, Administration Guide, Version 2.1, Oct. 4, 2010, pp. 1-53.
Aug. 13, 2013 International Search Report and Written Opinion issued in International Application No. PCT/US2013/027885.
D. Nurmi et al: "The Eucalyptus, Open-Source Cloud-Computing System", Cluster Computing and the Grid, 2009. CCGRID 109. 9th IEEE/ACM International Symposium on, IEEE, Piscataway, NJ, USA, May 18, 2009; pp. 124-131, XP031473033.
Greg Boss et al: "Cloud Computing", IBM Corporation, No. 1.0, Oct. 8, 2007, pp. 1-17, XP008146996, Retrieved from the Internet: URL:http://download.boulder.ibm.com/ibmdl/pub/software/dw/wes/hipods/Cloud_computing_wp_final_8Oct.pdf [retrieved on Jul. 29, 2013] the whole document.

* cited by examiner

*Primary Examiner* — Krisna Lim
(74) *Attorney, Agent, or Firm* — Banner & Witcoff, Ltd.

(57) ABSTRACT

Methods and systems for management of cloud computing resources are described herein. A management server for a cloud of physical computing resources may assign states to individual physical computing resources or groups of physical computing resources. The states may include a disabled state, in which only administrator access to the resources is permitted; an enabled state, in which user access to the resources is permitted; a restricted state, in which some, but not all user requests to the resources are permitted; and an unmanaged state, in which no communications between the resources and the management server are permitted.

20 Claims, 8 Drawing Sheets

ASSIGNING STATES TO CLOUD RESOURCES

FIELD

This application generally relates to managing the physical computing resources of a cloud. In particular, this Application relates to assigning states to cloud resources, or groups of resources.

BACKGROUND

In cloud computing environments, cloud users may be able to share physical computing resources with other users. For example, a single computer may run multiple instances of an operating system, each instance in a dedicated virtual machine. Cloud users may be able to share other physical computing resources as well, such as storage and networking hardware. Cloud users may interact with a management server in order to make requests of the cloud of physical computing resources.

As a cloud of physical computing resources becomes more heavily used, it may be desirable to reconfigure the resources in the cloud or to add resources to the cloud. Accordingly, there is a need for cloud management techniques that allow physical computing resources to be added, removed, or maintained without inhibiting the experience of cloud users.

SUMMARY

In light of the foregoing background, the following presents a simplified summary of the present disclosure in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

According to one aspect of the disclosure, a management server for a cloud of physical computing resources may store an organization of the physical computing resources. The physical computing resources may be organized into, for example, zones containing one or more pods. Further, each pod may be organized into one or more clusters, and each cluster may contain one or more hosts.

According to another aspect of the disclosure, a management server for a cloud of physical computing resources may associate a state with each physical computing resource. Further, the management server may associate a state with groups of physical computing resources. A management server may internally process a command changing the state of a group of physical computing resources by individually changing the state of each resource in the group. The management server may process user requests differently depending on a resource's state.

According to a further aspect of the disclosure, the states recognized by the management server may include a disabled state, in which only administrator access to the resources is permitted; an enabled state, in which user access to the resources is permitted; a restricted state, in which some, but not all user requests to the resources are permitted; and an unmanaged state, in which no communications between the resources and the management server are permitted.

According to yet another aspect of the disclosure, the management server may automatically change physical computing resources to the restricted state in response to measuring performance below a threshold level.

BRIEF DESCRIPTION OF THE DRAWINGS

Figure 1:
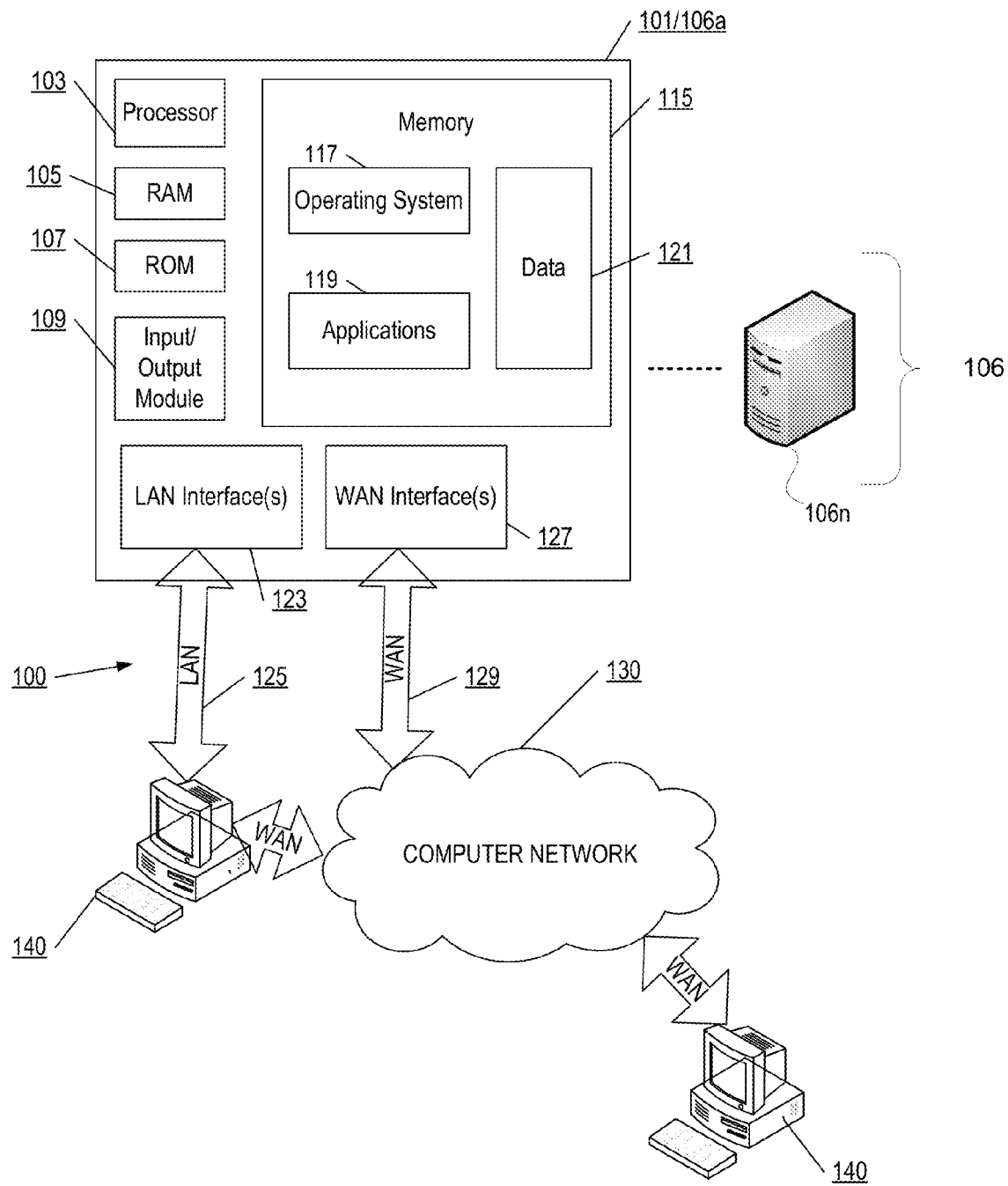

Having thus described aspects of the disclosure in general terms, reference will now be made to the accompanying drawings, which are not necessarily drawn to scale, and wherein:

FIG. 1 illustrates an example operating environment in which various aspects of the disclosure may be implemented.

Figure 2:
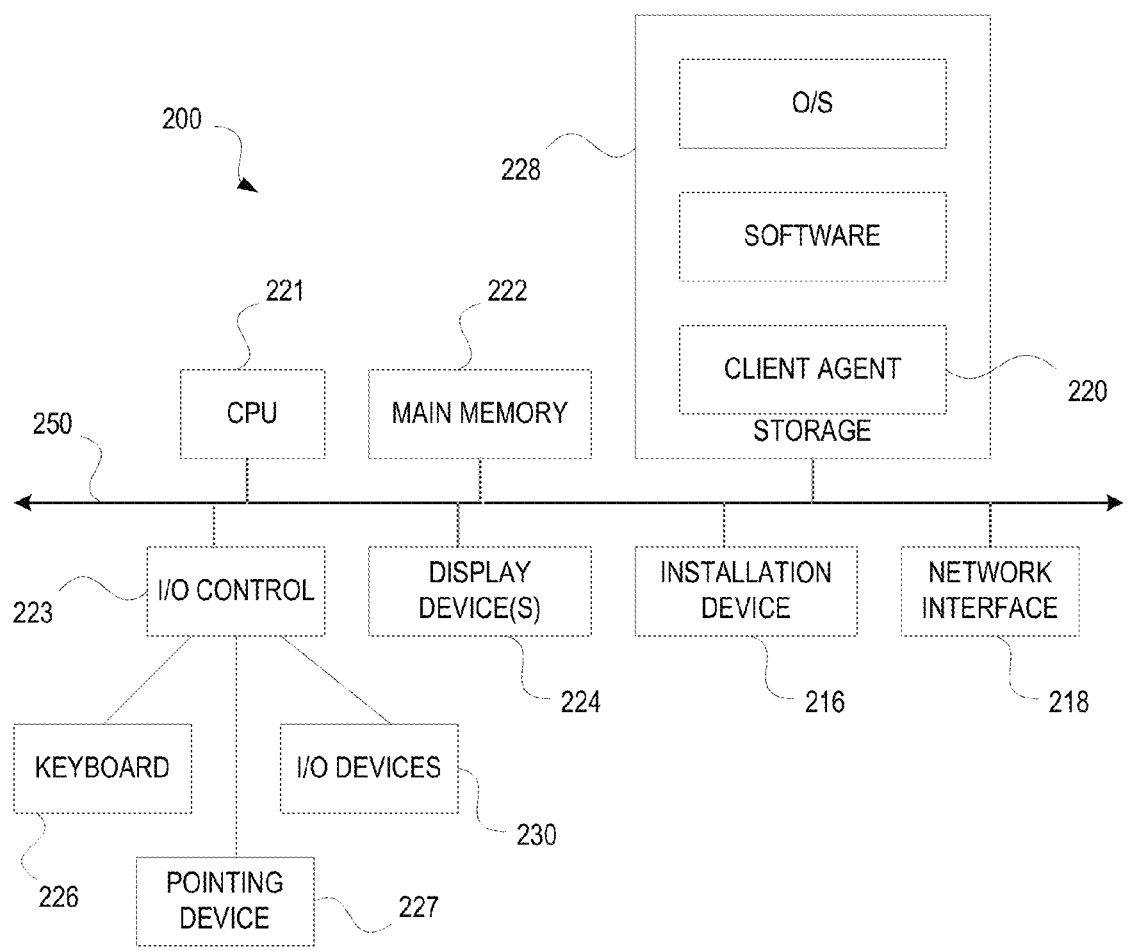
Figure 3:
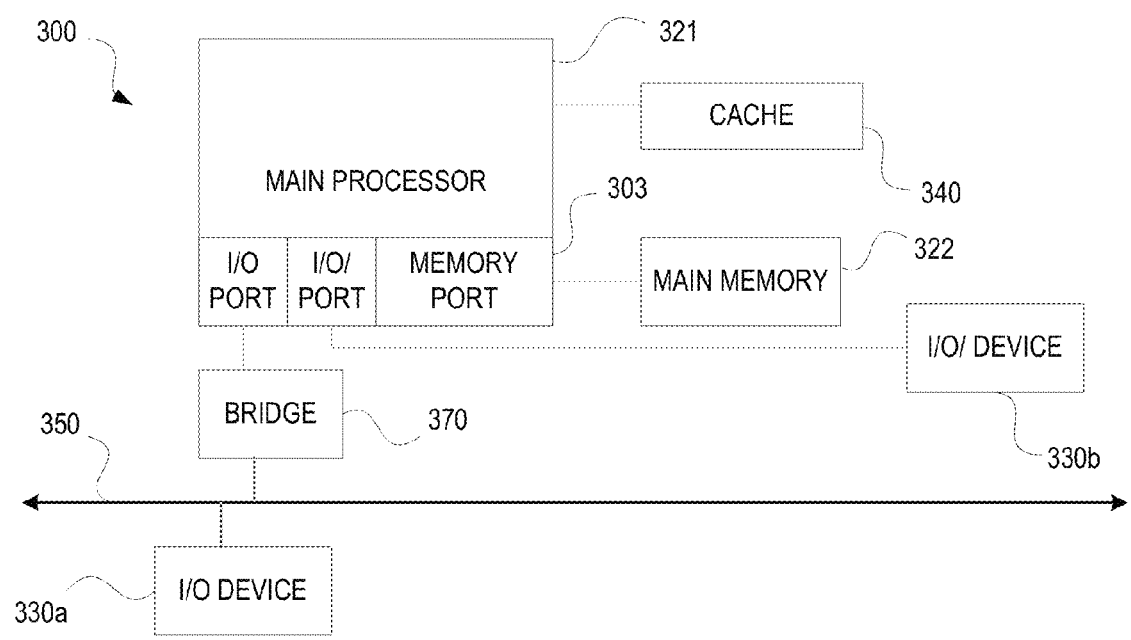

FIGS. 2 and 3 illustrates a computing devices that may be used in accordance with one or more illustrative aspects described herein.

Figure 4:
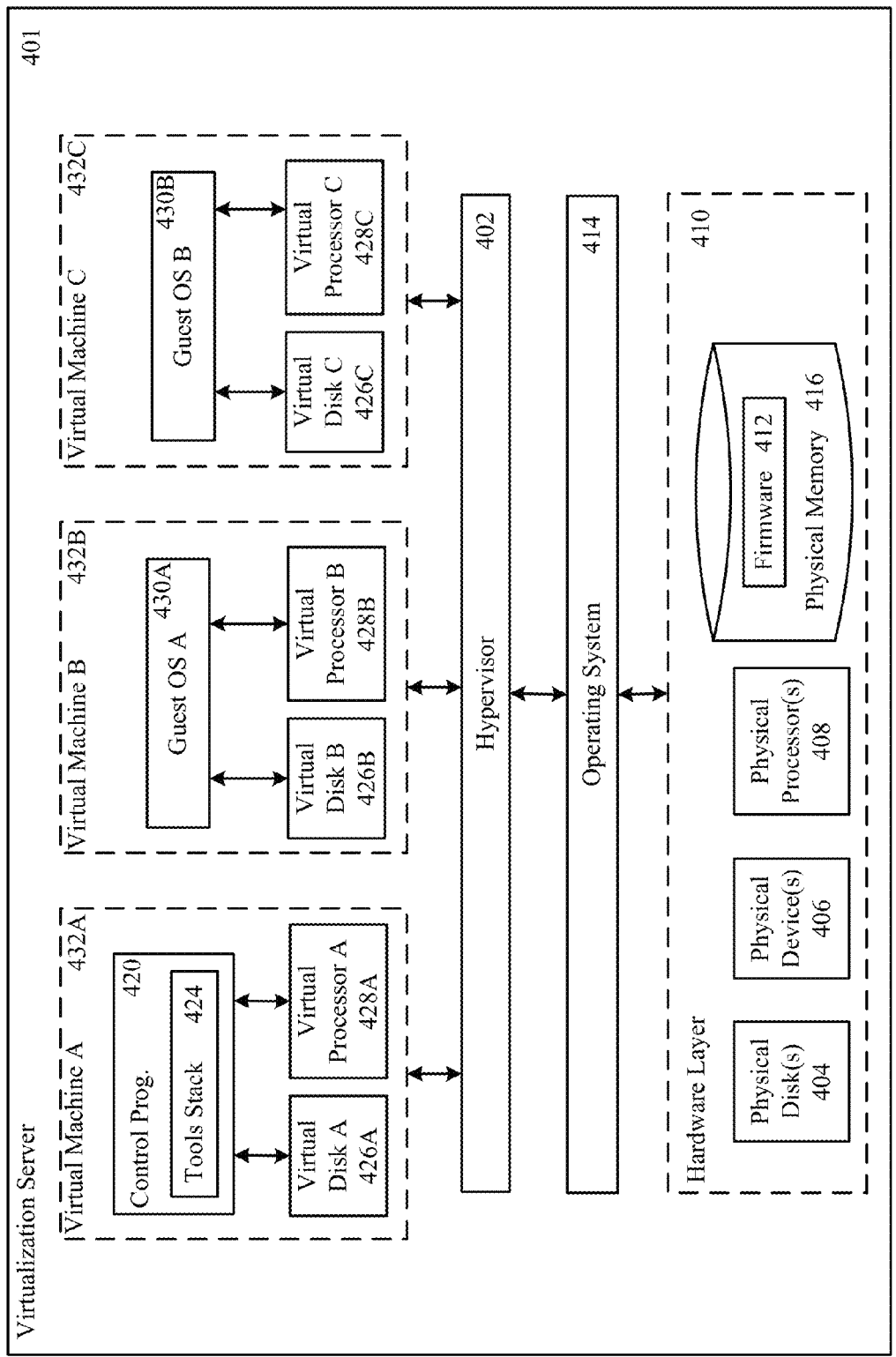

FIG. 4 is a block diagram that depicts embodiments of a virtualization server in accordance with one or more illustrative aspects described herein.

Figure 5:
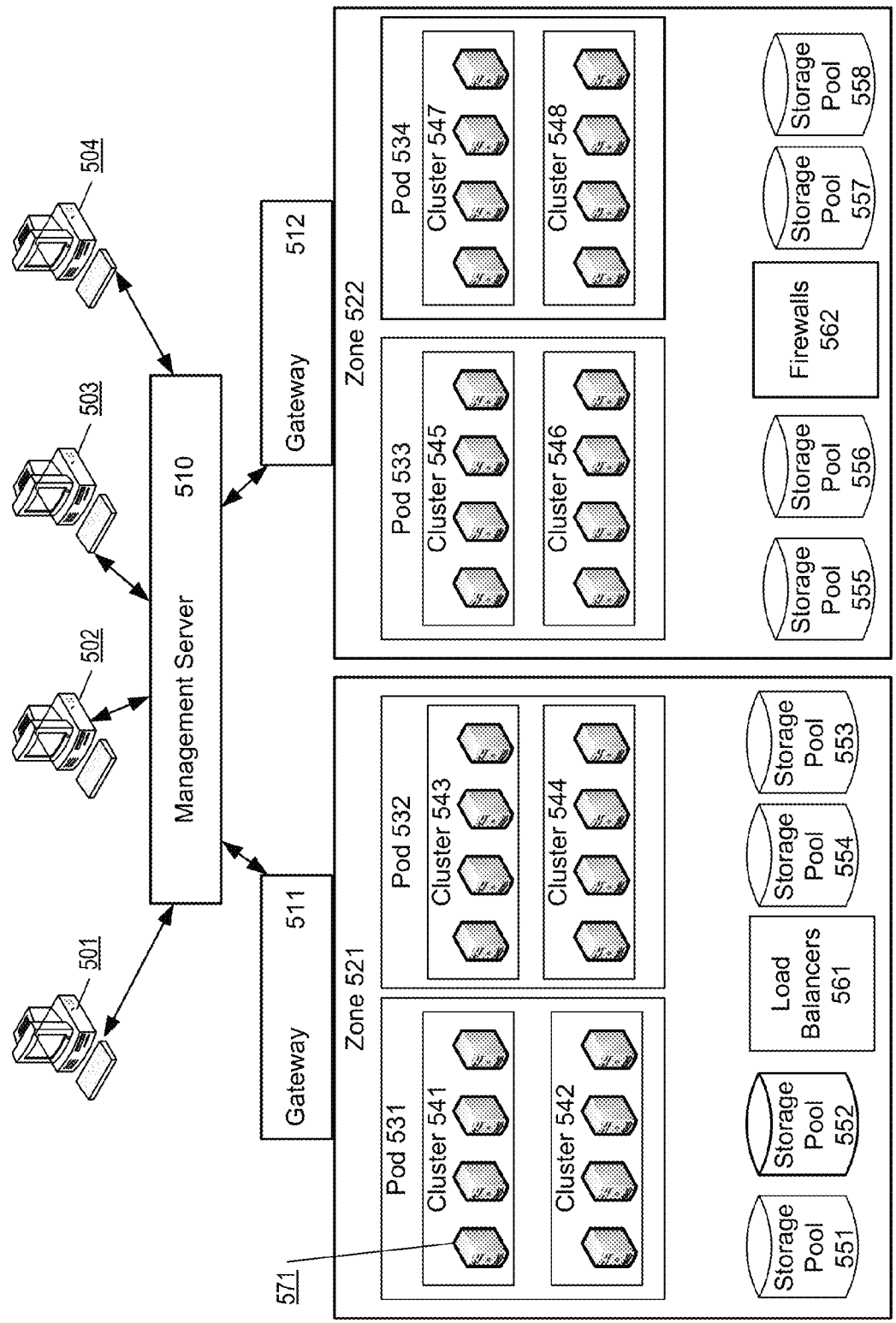

FIG. 5 illustrates an example of a cloud computing environment.

Figure 6:
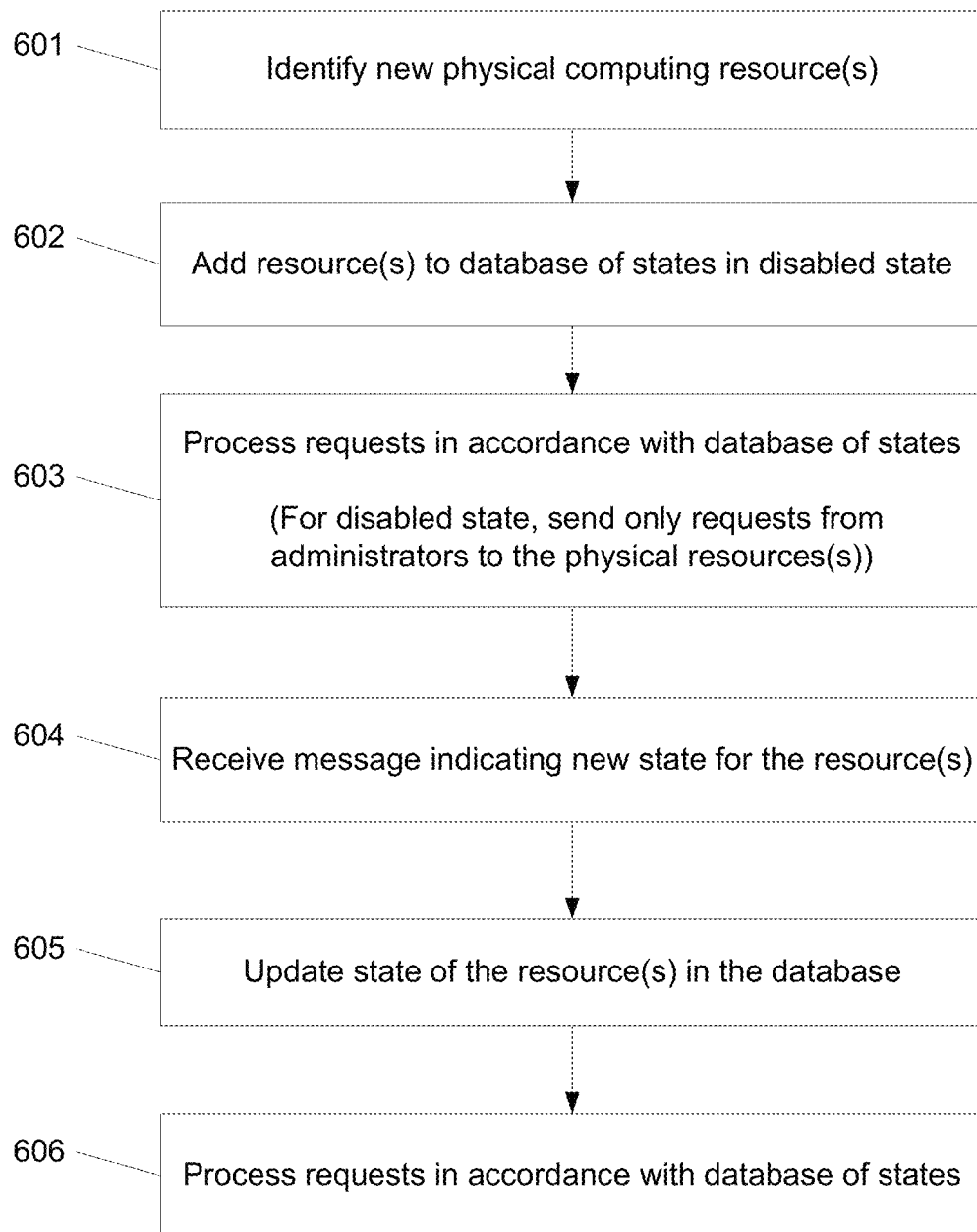

FIG. 6 illustrates a method that may be performed by a management server as new physical computing resources are added to a cloud.

Figure 7:
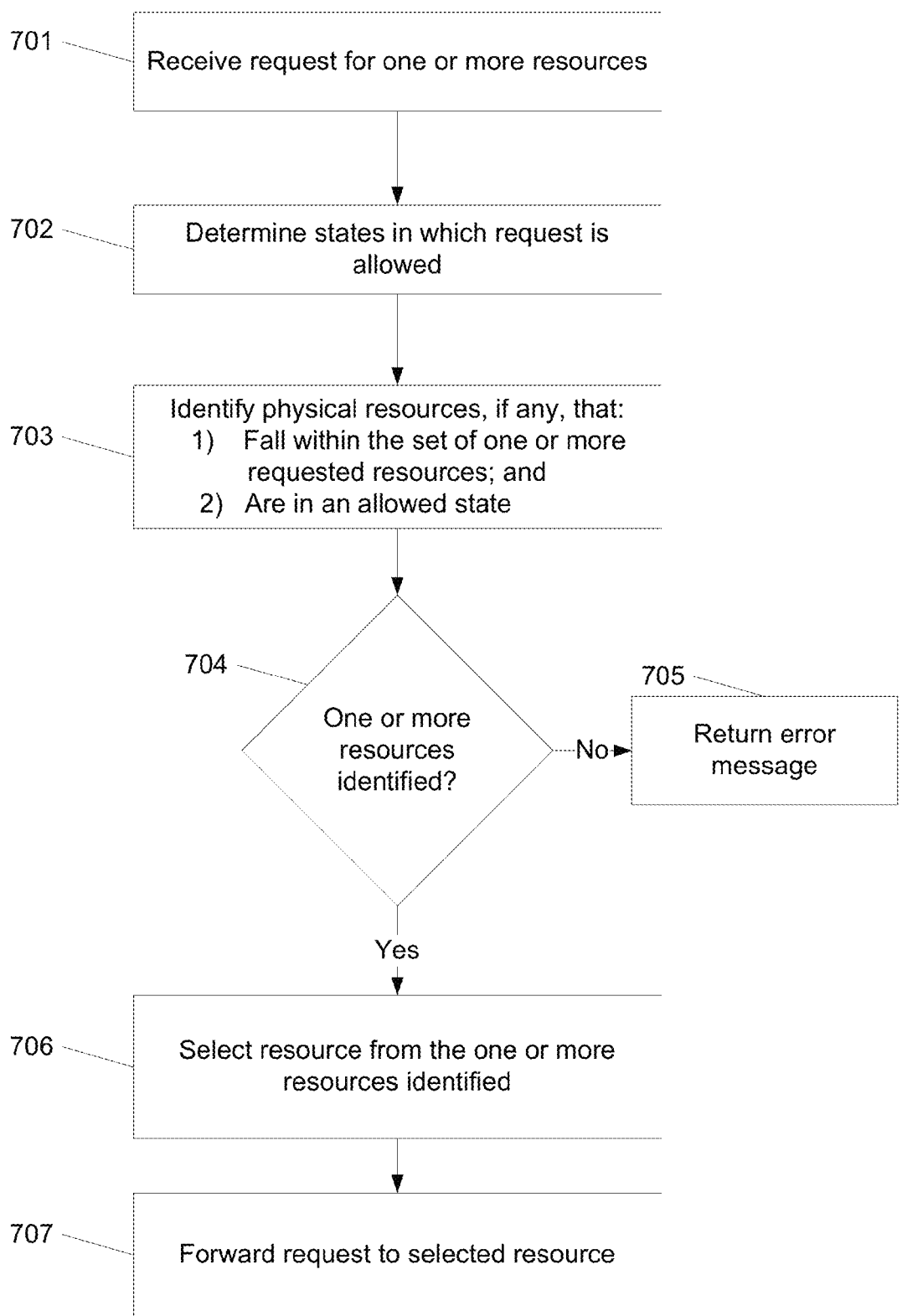

FIG. 7 illustrates a method that may be performed by a management server when receiving a request for a cloud resource.

Figure 8:
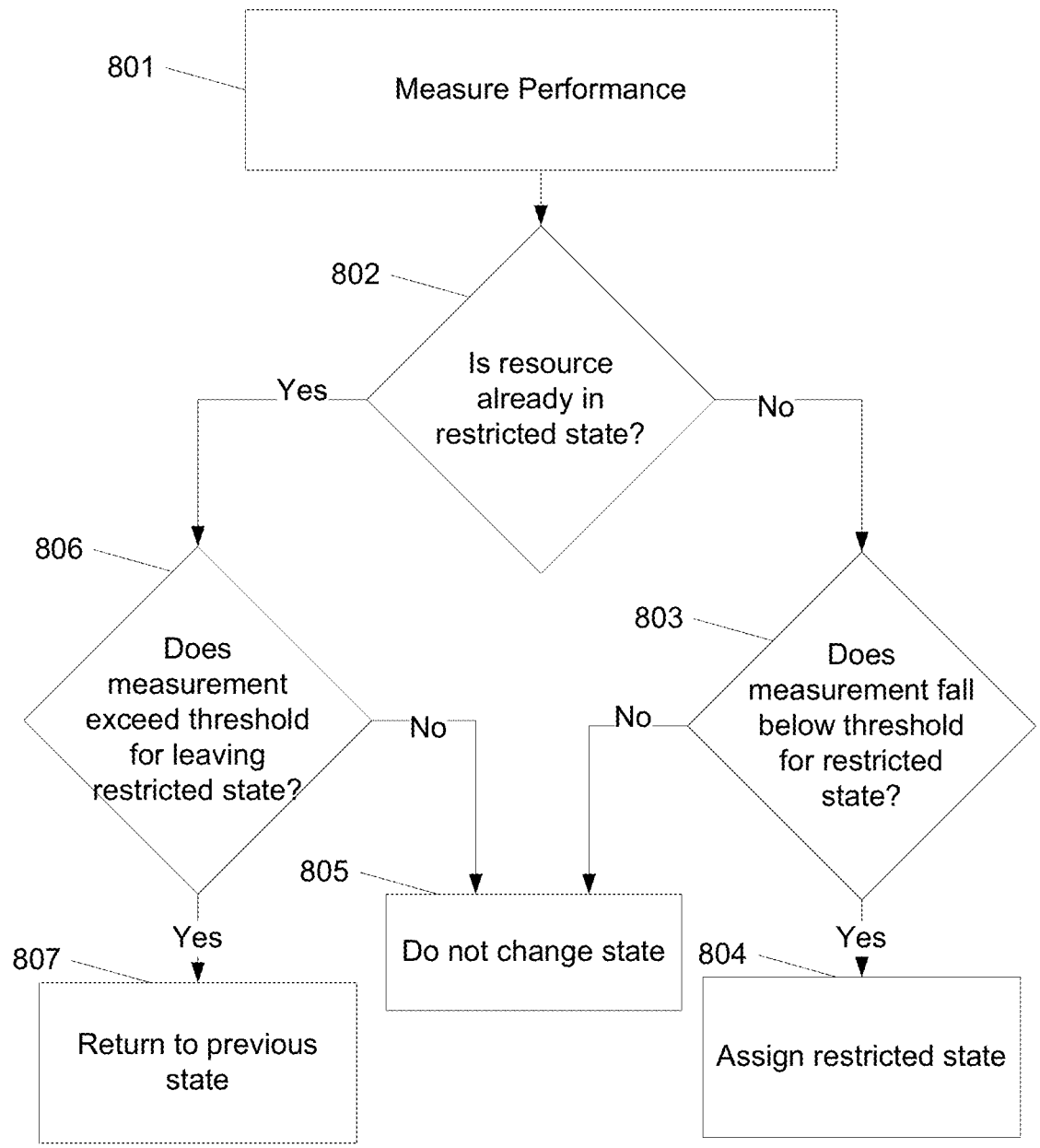

FIG. 8 illustrates a method of automatically changing the state of a physical computing resource based on performance information.

DETAILED DESCRIPTION

In the following description of the various embodiments, reference is made to the accompanying drawings, which form a part hereof, and in which is shown by way of illustration various embodiments in which aspects described herein may be practiced. It is to be understood that other embodiments may be utilized and structural and functional modifications may be made without departing from the scope and spirit of the present disclosure.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 illustrates an example block diagram of a generic computing device 101 (e.g., a computer server 106a) in an example computing environment 100 that may be used according to one or more illustrative embodiments of the disclosure. According to one or more aspects, generic computing device 101 may be a server 106a in a single-server or multi-server desktop virtualization system (e.g., a cloud system) configured to provide virtual machines for client access devices. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 140 (also referred to as client devices). The terminals 140 may be personal computers or servers that include many or all of the elements described above with respect to the generic computing device 101. The network connections depicted in FIG. 1 include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as computer network 130 (e.g., the Internet). It will be appreciated that the network connections shown are illustrative and other means of establishing a communications link between the computers may be used.

Generic computing device 101 and/or terminals 140 may also be mobile terminals (e.g., mobile phones, smartphones, PDAs, notebooks, etc.) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an Application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 140 that displays application output generated by an application remotely executing on a server 106 or other remotely located machine. In these embodiments, the client device 140 can display the application output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106A-106N such that the servers 106A-106N are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc.; Riverbed Technology, Inc.; F5 Networks, Inc.; or Juniper Networks, Inc. Some embodiments include a first server 106A that receives requests from a client machine 140, forwards the request to a second server 106*n*, and responds to the request generated by the client machine 140 with a response from the second server 106*n*. The first server 106A can acquire an enumeration of applications available to the client machine 140 and well as address information associated with an application server 106 hosting an application identified within the enumeration of applications. The first server 106A can then present a response to the client's request using a web interface, and communicate directly with the client 140 to provide the client 140 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 140 can, in some embodiments, be a client node that seeks access to resources provided by a server 106. In other embodiments, the server 106 may provide clients 140 or client nodes with access to hosted resources. The server 106, in some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include: a bus network topology; a star network topology; a ring network topology; a repeater-based network topology; or a tiered-star network topology. Additional embodiments may include a network of mobile telephone networks that use a protocol to communicate among mobile devices, where the protocol can be any one of the following: AMPS; TDMA; CDMA; GSM; GPRS UMTS; or any other protocol able to transmit data among mobile devices.

Illustrated in FIG. 2 is an embodiment of a computing device 200, where the client machine 140 and server 106 illustrated in FIG. 1 may be deployed as and/or executed on any embodiment of the computing device 200 illustrated and described herein. Included within the computing device 200 is a system bus 250 that communicates with the following components: a central processing unit 221; a main memory 222; storage memory 228; an input/output (I/O) controller 223; display devices 224A-224N; an installation device 216; and a network interface 218. In one embodiment, the storage memory 228 includes: an operating system, software routines, and a client agent 220. The I/O controller 223, in some embodiments, is further connected to a keyboard 226, and a pointing device 227. Other embodiments may include an I/O controller 223 connected to more than one input/output device 230A-230N.

FIG. 3 illustrates one embodiment of a computing device 300, where the client machine 140 and server 106 illustrated in FIG. 1 can be deployed as and/or executed on any embodiment of the computing device 300 illustrated and described herein. Included within the computing device 300 is a system bus 350 that communicates with the following components: a bridge 370, and a first I/O device 330*a*. In another embodiment, the bridge 370 is in further communication with the main central processing unit 321, where the central processing unit 321 can further communicate with a second I/O device 330b, a main memory 322, and a cache memory 340. Included within the central processing unit 321, are I/O ports, a memory port 303, and a main processor.

Embodiments of the computing machine 300 can include a central processing unit 321 characterized by any one of the following component configurations: logic circuits that respond to and process instructions fetched from the main memory unit 322; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 322 may include any combination of the following: a microprocessor, a microcontroller, a central processing unit with a single processing core, a central processing unit with two processing cores, or a central processing unit with more than one processing core.

While FIG. 3 illustrates a computing device 300 that includes a single central processing unit 321, in some embodiments the computing device 300 can include one or more processing units 321. In these embodiments, the computing device 300 may store and execute firmware or other executable instructions that, when executed, direct the one or more processing units 321 to simultaneously execute instructions or to simultaneously execute instructions on a single piece of data. In other embodiments, the computing device 300 may store and execute firmware or other executable instructions that, when executed, direct the one or more processing units to each execute a section of a group of instructions. For example, each processing unit 321 may be instructed to execute a portion of a program or a particular module within a program.

In some embodiments, the processing unit 321 can include one or more processing cores. For example, the processing unit 321 may have two cores, four cores, eight cores, etc. In one embodiment, the processing unit 321 may comprise one or more parallel processing cores. The processing cores of the processing unit 321, may in some embodiments access available memory as a global address space, or in other embodiments, memory within the computing device 300 can be segmented and assigned to a particular core within the processing unit 321. In one embodiment, the one or more processing cores or processors in the computing device 300 can each access local memory. In still another embodiment, memory within the computing device 300 can be shared amongst one or more processors or processing cores, while other memory can be accessed by particular processors or subsets of processors. In embodiments where the computing device 300 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 300 includes one or more processing units 321, or a processing unit 321 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 300, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 321. In other embodiments, the computing device 300 can include one or more processing units 321, where at least one processing unit 321 is dedicated to processing and rendering graphics.

One embodiment of the computing machine 300 includes a central processing unit 321 that communicates with cache memory 340 via a secondary bus also known as a backside bus, while another embodiment of the computing machine 300 includes a central processing unit 321 that communicates with cache memory via the system bus 350. The local system bus 350 can, in some embodiments, also be used by the central processing unit to communicate with more than one type of I/O device 330a-330n. In some embodiments, the local system bus 350 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 300 include an I/O device 330a-330n that includes a video display 224 that communicates with the central processing unit 321. Still other versions of the computing machine 300 include a processor 321 connected to an I/O device 330a-330n via any one of the following connections: HyperTransport, Rapid I/O, or InfiniBand. Further embodiments of the computing machine 300 include a processor 321 that communicates with one I/O device 330a using a local interconnect bus and a second I/O device 330b using a direct connection.

The computing device 300, in some embodiments, includes a main memory unit 322 and cache memory 340. The cache memory 340 can be any memory type, and in some embodiments can be any one of the following types of memory: SRAM; BSRAM; or EDRAM. Other embodiments include cache memory 340 and a main memory unit 322 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 321 that can access the main memory 322 via: a system bus 350; a memory port 303; or any other connection, bus or port that allows the processor 321 to access memory 322.

One embodiment of the computing device 200/300 provides support for any one of the following installation devices 216: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 220, or any portion of a client agent 220. The computing device 200/300 may further include a storage device 228 that can be either one or more hard disk drives, or one or more redundant arrays of independent disks; where the storage device is configured to store an operating system, software, programs applications, or at least a portion of the client agent 220. A further embodiment of the computing device 200, 300 includes an installation device 216 that is used as the storage device 228.

The computing device 200, 300 may further include a network interface 218 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 200, 300 includes a network interface 218 able to communicate with additional computing devices 200', 300' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 218 can comprise any one of: a built-in network adapter; a network interface card; a PCMCIA network card; a card bus network adapter; a wireless network adapter; a USB network adapter; a modem; or any other device suitable for interfacing the computing device 200, 300 to a network capable of communicating and performing the methods and systems described herein.

Embodiments of the computing device 200, 300 include any one of the following I/O devices 230a-230n: a keyboard 226; a pointing device 227; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 223 may in some embodiments connect to multiple I/O devices 230a-230n to control the one or more I/O devices. Some embodiments of the I/O devices 230a-230n may be configured to provide storage or an installation medium 216, while others may provide a universal serial bus (USB) interface for receiving USB storage devices such as the USB Flash Drive line of devices manufactured by Twintech Industry, Inc. Still other embodiments include an I/O device 230 that may be a bridge between the system bus 250 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 200, 300 can connect to multiple display devices 224a-224n, in other embodiments the computing device 100 can connect to a single display device 224, while in still other embodiments the computing device 200, 300 connects to display devices 224a-224n that are the same type or form of display, or to display devices that are different types or forms. Embodiments of the display devices 224a-224n can be supported and enabled by the following: one or multiple I/O devices 230a-230n; the I/O controller 223; a combination of I/O device(s) 230a-230n and the I/O controller 223; any combination of hardware and software able to support a display device 224a-224n; any type and/or form of video adapter, video card, driver, and/or library to interface, communicate, connect or otherwise use the display devices 224a-224n. The computing device 200, 300 may in some embodiments be configured to use one or multiple display devices 224A-224N, these configurations include: having multiple connectors to interface to multiple display devices 224A-224N; having multiple video adapters, with each video adapter connected to one or more of the display devices 224A-224N; having an operating system configured to support multiple displays 224A-224N; using circuits and software included within the computing device 200 to connect to and use multiple display devices 224A-224N; and executing software on the main computing device 200 and multiple secondary computing devices to enable the main computing device 200 to use a secondary computing device's display as a display device 224A-224N for the main computing device 200. Still other embodiments of the computing device 200 may include multiple display devices 224A-224N provided by multiple secondary computing devices and connected to the main computing device 200 via a network.

In some embodiments, the computing machine 200 can execute any operating system, while in other embodiments the computing machine 200 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 200 can execute multiple operating systems. For example, the computing machine 200 can execute PARALLELS or another virtualization platform that can execute or manage a virtual machine executing a first operating system, while the computing machine 200 executes a second operating system different from the first operating system.

The computing machine 200 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 200 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

In some embodiments, the computing device 200 may have different processors, operating systems, and input devices consistent with the device. For example, in one embodiment, the computing device 200 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments the computing device 200 is a mobile device, such as a JAVA-enabled cellular telephone or personal digital assistant (PDA), such as the i55sr, i58sr, i85s, i88s, i90c, i95cl, or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computing device 200 is a mobile device manufactured by Nokia of Finland, or by Sony Ericsson Mobile Communications AB of Lund, Sweden.

In still other embodiments, the computing device 200 is a Blackberry handheld or smart phone, such as the devices manufactured by Research In Motion Limited, including the Blackberry 7100 series, 8700 series, 7700 series, 7200 series, the Blackberry 7520, or the Blackberry Pearl 8100. In yet other embodiments, the computing device 200 is a smart phone, Pocket PC, Pocket PC Phone, or other handheld mobile device supporting Microsoft Windows Mobile Software. Moreover, the computing device 200 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 200 is a digital audio player. In one of these embodiments, the computing device 200 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 200 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 200 is a portable media player, such as the Zen Vision W, the Zen Vision series, the Zen Portable Media Center devices, or the Digital MP3 line of MP3 players, manufactured by Creative Technologies Ltd. In yet other embodiments, the computing device 200 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 200 comprises a combination of devices, such as a mobile phone combined with a digital audio player or portable media player. In one of these embodiments, the computing device 200 is a Motorola RAZR or Motorola ROKR line of combination digital audio players and mobile phones. In another of these embodiments, the computing device 200 is an iPhone smartphone, manufactured by Apple Computer of Cupertino, Calif.

FIGS. 1-3 show a high-level architecture of an illustrative desktop virtualization system. As shown, the desktop virtualization system may be single-server or multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications, as used herein, are programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Having described in FIGS. 1-3 various examples of desktop virtualization systems, and certain software and functionality that may be included in servers 106 of such systems, the following paragraphs provide additional examples of various methods and systems relating to computing devices that may be used in a cloud computing environment.

Illustrated in FIG. 4 is one embodiment of a computer device 401 configured as a virtualization server in a virtualization environment, for example, a single-server, multi-server, or cloud computing environment. The virtualization server 401 illustrated in FIG. 1 can be deployed as and/or implemented by one or more embodiments of the server 106 illustrated in FIG. 1 or the computing devices 200 and 300 illustrated in FIGS. 2 and 3. Included in virtualization server 401 is a hardware layer that can include one or more physical disks 404, one or more physical devices 406, one or more physical processors 408 and a physical memory 416. In some embodiments, firmware 412 can be stored within a memory element in the physical memory 416 and can be executed by one or more of the physical processors 408. The virtualization server 401 may further include an operating system 414 that may be stored in a memory element in the physical memory 416 and executed by one or more of the physical processors 408. Still further, a hypervisor 402 may be stored in a memory element in the physical memory 416 and can be executed by one or more of the physical processors 408. Executing on one or more of the physical processors 408 may be one or more virtual machines 432A-C (generally 432). Each virtual machine 432 may have a virtual disk 426A-C and a virtual processor 428A-C. In some embodiments, a first virtual machine 432A may execute, on a virtual processor 428A, a control program 420 that includes a tools stack 424. In other embodiments, one or more virtual machines 432B-C can executed, on a virtual processor 428B-C, a guest operating system 430A-B.

Further referring to FIG. 4, and in more detail, the virtualization server 401 may include a hardware layer 410 with one or more pieces of hardware that communicate with the virtualization server 401. In some embodiments, the hardware layer 410 can include one or more physical disks 404, one or more physical devices 406, one or more physical processors 408, and one or more memory 416. Physical components 404, 406, 408, and 416 may include, for example, any of the components described above in FIGS. 1-3. For instance, physical disks 404 may include permanent memory storage, temporary memory storage, disk drives (e.g. optical, floppy, tape), hard disks, external hard drives, flash memory, network-attached storage, a storage-area network, or any other storage repository that the virtualization server 401 can access. Physical devices 406 may include any device included in the virtualization server 401 and/or any combination of devices included in the virtualization server 401 and external devices that communicate with the virtualization server 401. A physical device 406 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 401. The physical memory 416 in the hardware layer 410 may include any type of memory. The physical memory 416 may store data, and in some embodiments may store one or more programs, or set of executable instructions. FIG. 4 illustrates an embodiment where firmware 412 is stored within the physical memory 416 of the virtualization server 401. Programs or executable instructions stored in the physical memory 416 can be executed by the one or more processors 408 of the virtualization server 401.

Virtualization server 401 may also include a hypervisor 402. In some embodiments, hypervisor 402 may be a program executed by processors 408 on the virtualization server 401 to create and manage any number of virtual machines 432. The hypervisor 402 can be referred to as a virtual machine monitor, or platform virtualization software. In some embodiments, a hypervisor 402 can be any combination of executable instructions and hardware that monitors virtual machines executing on a computing machine. Hypervisor 402 may be Type 2 hypervisor, or a hypervisor that executes within an operating system 414 executing on the virtualization server 401. A Type 2 hypervisor, in some embodiments, executes within an operating system 414 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 401 in a virtualization environment may include a Type 1 hypervisor (Not Shown). A Type 1 hypervisor may execute on the virtualization server 401 by directly accessing the hardware and resources within the hardware layer 410. That is, while a Type 2 hypervisor 402 accesses system resources through a host operating system 414, a Type 1 hypervisor may directly access all system resources without needing a host operating system 414. A Type 1 hypervisor may execute directly on one or more physical processors of 408 the virtualization server 401, and may include program data stored in the physical memory 416.

The hypervisor 402, in some embodiments, can provide virtual resources to operating systems 430 or control programs 420 executing on virtual machines 432 in any manner that simulates the operating systems 430 or control programs 420 having direct access to system resources. System resources can include: physical devices 406; physical disks; physical processors; physical memory 416 and any other component included in the virtualization server 401 hardware layer 410. In these embodiments, the hypervisor 402 may be used to emulate virtual hardware, partition physical hardware, virtualize physical hardware, or execute virtual machines that provide access to computing environments. In still other embodiments, the hypervisor 402 controls processor scheduling and memory partitioning for a virtual machine 432 executing on the virtualization server 401. Hypervisor 402 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 401 executes a hypervisor 402 that creates a virtual machine platform on which guest operating systems may execute. In these embodiments, the virtualization server 401 can be referred to as a host server. An example of such a virtualization server is the XEN SERVER provided by Citrix Systems, Inc., of Fort Lauderdale, Fla.

The hypervisor 402 may create one or more virtual machines 432B-C (generally 432) in which guest operating systems 430 execute. In some embodiments, the hypervisor 402 may load a virtual machine image to create a virtual machine 432. In other embodiments, the hypervisor 402 may executes a guest operating system 430 within the virtual machine 432. In still other embodiments, the virtual machine 432 may execute the guest operating system 430.

In addition to creating virtual machines 432, the hypervisor 402 may control the execution of at least one virtual machine 432. In other embodiments, the hypervisor 402 may presents at least one virtual machine 432 with an abstraction of at least one hardware resource provided by the virtualization server 401 (e.g., any hardware resource available within the hardware layer 410). In other embodiments, the hypervisor 402 may control the manner in which virtual machines 432 access the physical processors 408 available in the virtualization server 401. Controlling access to the physical processors 408 may include determining whether a virtual machine 432 should have access to a processor 408, and how physical processor capabilities are presented to the virtual machine 432.

As shown in the example of FIG. 4, the virtualization server 401 may host or execute one or more virtual machines 432. A virtual machine 432 is a set of executable instructions that, when executed by a processor 408, imitate the operation of a physical computer such that the virtual machine 432 can execute programs and processes much like a physical computing device. While FIG. 4 illustrates an embodiment where a virtualization server 401 hosts three virtual machines 432, in other embodiments the virtualization server 401 can host any number of virtual machines 432. The hypervisor 402, in some embodiments, provides each virtual machine 432 with a unique virtual view of the physical hardware, memory, processor and other system resources available to that virtual machine 432. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 402 may create one or more unsecure virtual machines 432 and one or more secure virtual machines 432. Unsecure virtual machines 432 may be prevented from accessing resources, hardware, memory locations, and programs that secure virtual machines 432 may be permitted to access. In other embodiments, the hypervisor 402 may provide each virtual machine 432 with a substantially similar virtual view of the physical hardware, memory, processor and other system resources available to the virtual machines 432.

Each virtual machine 432 may include a virtual disk 426A-C (generally 426) and a virtual processor 428A-C (generally 428.) The virtual disk 426, in some embodiments, is a virtualized view of one or more physical disks 404 of the virtualization server 401, or a portion of one or more physical disks 404 of the virtualization server 401. The virtualized view of the physical disks 404 can be generated, provided and managed by the hypervisor 402. In some embodiments, the hypervisor 402 provides each virtual machine 432 with a unique view of the physical disks 404. Thus, in these embodiments, the virtual disk 426 included in each virtual machine 432 can be unique when compared with the other virtual disks 426.

A virtual processor 428 can be a virtualized view of one or more physical processors 408 of the virtualization server 401. In some embodiments, the virtualized view of the physical processors 408 can be generated, provided and managed by the hypervisor 402. In some embodiments, the virtual processor 428 has substantially all of the same characteristics of at least one physical processor 408. In other embodiments, the virtual processor 408 provides a modified view of the physical processors 408 such that at least some of the characteristics of the virtual processor 428 are different than the characteristics of the corresponding physical processor 408.

FIG. 5 illustrates an example of a cloud computing environment. As seen in FIG. 5, client computers 501-504 may communicate with management server 510. Management server 510 may be implemented on one or more than one physical server. Client computers 501-504 may connect to management server 510 via the Internet. In some environments, access to management server 510 may be restricted to only client computers on one or more networks.

A user of a client computer may, for example, request access to one or more of the computing resources managed by management server 510. Management server 510 may run, for example, CLOUDSTACK by Citrix System or OPENSTACK. It may manage computing resources such as host computers, data storage devices, and networking devices, such as firewalls, network address translators, load balancers, virtual private network (VPN) gateways, Dynamic Host Configuration Protocol (DHCP) routers, and the like.

A user of a client computer may request access to one of the computing resources managed by management server 510, such as host computer 571. A host computer may be, for example, a virtualization server capable of running one or more virtual machines. A user of a client computer may request, for example, access to an existing virtual machine or that a virtual machine be created or destroyed. In some embodiments, the user may identify a specific host or request that virtual resources be created within a specific group of hosts. A management server may allocate resources in group requested, or it may allocate resources in a different group of hosts to, for example, avoid overloading a physical computing resource. In some embodiments, the host used to fulfill a user request may be governed solely by management server 510.

In a computing cloud, such as the one managed by management server 510, a zone is a collocated set of physical computing resources. Each zone may be geographically disbursed from each other zone. For example, zone 521 may be located in California, and zone 522 may be located in Maryland. Management sever 510 may be located in a third zone (not shown). Each zone may include an internal network that interfaces with devices that are outside of the zone, such as management server 510, through a gateway. As illustrated in FIG. 5, all communications between devices in zone 521 and devices outside zone 521 are routed through gateway 511, and all communication between devices in zone 522 and outside zone 522 are routed through gateway 512.

Zones may be very large, and it is therefore useful to subdivide zones into smaller units. One such unit is a pod. A pod may be a group of hosts that are co-located in one or more senses. For example, all of the host computers on a single rack of a data center may be a pod. Similarly, the host computers that share a network switch and/or power line may be a pod.

Pods may be further subdivided into clusters. A cluster may be a group of hosts that share another physical resource, such as a storage pool. A storage pool is a group of one or more magnetic hard drives, solid state drives, or other storage media. The storage media of a storage pool may be managed via one or more storage servers. In the example of zone 521 of FIG. 5, each cluster may share a storage pool. Each host in cluster 541 may share storage pool 551, each host in cluster 542 may share storage pool 552, etc. Clusters may be groups of host computers that share other items, such as load balancers (e.g. load balancers 561), firewalls (e.g. firewalls 562), or other computing resources in a zone. While only a single load balancer 561 or a single firewall 562 are shown in each zone, each zone may include both a load balancer, firewall, and/or other computing resources.

In some embodiments, the clusters defined by one shared physical resource may differ from the clusters defined by another shared physical resource. For example, hosts A, B, and C may share storage pool X, thereby forming a cluster with respect to storage pool X, but hosts A, B, and D may share load balancer Y, thereby forming a different cluster with respect to load balancer Y. (Host C may use a different load balancer or no load balancer at all).

Although computing resources may be dedicated to a particular cluster, as in the example of the storage pools of FIG. 5, computing resources may be shared more widely. For example, a firewall may serve some or all of the hosts in a pod or some or all of the hosts in a zone. Similarly, computing resources may be shared more narrowly. For example, a firewall may serve only some of the hosts in a cluster, but not all of them.

A management server may store the relations between the physical computing resources it manages in, for example, a database. Thus, a management server may be able to identify the individual physical computing resources that make up each cluster, pod, or zone.

The number of requests received from client computers 501-504 (or other client computers) may vary over time. If the workload generated from those requests grows, or is anticipated to grow, an administrator of the management server may add hosts to a zone in order to accommodate the increased workload. Hosts may be removed from a zone due to, for example, lack of demand, obsolescence, hardware or software errors, etc. Storage pools, firewalls, or other computing resources may also be added or subtracted. Further, entire zones may be added or removed from the cloud managed by management server 510.

Access to hosts or other physical computing resources may be removed or restricted in various ways. For example, resources may be placed in a disabled state by default when first added to a cloud. An administrator or management server 510 may also place a resource in the disabled state. For example, if error reports or complaints indicate a potential problem with a resource, it may be placed in the disabled state for testing. This may be done automatically by management server 510, or manually by an administrator of management server 510. While in the disabled state, a physical computing resource can only be accessed by the administrators of management server 510, and cannot be accessed by other users of management server 510, such as the other users of client computers 501-504. This disabled state allows administrators to perform all of the tasks a normal user might perform, such as requesting the creation of a virtual machine and using a virtual machine. Once proper operation of the resource is verified, the resource may be placed in the enabled state. In the enabled state, the physical computing resource may be used to fulfill requests from normal users, such as requests for creation of a virtual machine, requests that data be stored, etc.

Physical computing resources may also be placed in a restricted state. In the restricted state, some user requests may be accepted, but not others. For example, a user request to access an existing virtual machine may be accepted, but a user request to create a new virtual machine on the physical resource may be denied. Similarly, a request to access an existing storage volume, firewall, or other physical resource may be accepted, but a request to allocate a new storage volume, firewall an additional resource, or otherwise expand the use of the physical computing resource may be denied. As these examples illustrate, the restricted state may be used to limit the workload placed on a resource or to ensure that a minimal level of service is provided by the resource. As described below with respect to FIG. 8, the restricted state may be applied to resources automatically.

If a request to create a new virtual machine specifies a group of resources, such as a cluster, then the management server may deny the request only if all of the hosts in the group are in a state that does not allow for the request to be fulfilled. If one or more of the hosts in the group are in a state that allows the request to be fulfilled, such as the enabled state, then the management server may direct that the request be fulfilled on one of the available physical computing resources. Where a user request does not specify a specific resource or a group of resources, then the request may be treated the same as a request that specifies all of the physical computing resources that are available to the requestor. As with a request that does specify a group of physical computing resources to be used to fulfill the request, the request may be fulfilled unless all of the resources are in a state that does not allow the request to be fulfilled, such as the restricted state.

Physical computing resources may also be placed in an unmanaged state. In the unmanaged state, no traffic may flow between the management server and the resource. The management server will not direct traffic to the resource, and any traffic from the resource to the management server will be deleted or otherwise ignored. The unmanaged state allows for maintenance tasks that interrupt the operation of the resource to take place. For example, a host may be placed in the unmanaged state prior to updating or otherwise changing the hypervisor software running on the host.

Although the enabled, disabled, restricted, and unmanaged states are discussed above with respect to individual physical computing resources, each of these states may also be applied to groups of physical computing resources, such as clusters, pods, and zones. Assigning a state to a group of physical computing resources is logically equivalent to assigning the state to each and every resource in the group individually. However, by enabling states to be set at this higher level of granularity, the process of adding, removing, upgrading, or otherwise modifying computing resources may be simplified. For example, instead of addressing each of the tens, hundreds, or even thousands of physical computing resources in a zone, a single command to change the state of the zone can allow for much more efficient administration of the cloud. This is especially so because resources are generally added to zones in units, such as pods.

Fewer than all of the states described above may be included on a management server. Conversely, additional states may be available. For example, a maintenance state may be included. In a maintenance state, new virtual machines or other virtual resources are not allocated, similar to the restricted state. Further, existing virtual machines or other virtual resources are migrated away to other physical computing resources. Only requests for virtual machines or virtual resources that have not yet been migrated away are passed to the physical resource in the maintenance state. Migration of virtual machines to another host may be delayed due to for example, continued use of the virtual machine.

Subsets of the states described above may also be available. For example, a first restricted state may limit creation of new virtual machines by only some users, and a second restricted state may limit creation of new virtual machines by all users.

A physical computing resource might not be notified when its state is changed. For example, a host in the restricted, disabled, or unmanaged state may operate just as it would in the enabled state. A host in the restricted, disabled, or unmanaged state would not receive certain types of requests due to being in one of these states, but the host might not be aware of a reason why it is not receiving requests. A management server may block or otherwise redirect user or administrator requests, as discussed above, based on the state of a physical resource. The management server may maintain a database of physical computing resources and their states. In addition to storing the states of individual physical computing resources, the management server may also store the states of groups of resources. For example, pod 531 may be associated with the disabled state. This may guarantee that all of the hosts within pod 531 are disabled, and records for individual hosts within the pod might not be checked (and might not exist). In other embodiments, records for individual hosts may override a record for a group. For example, if a record shows host 571 in the enabled state, then host 571 may be enabled state even though pod 531 is in the disabled state.

A gateway, such as gateway 511 or gateway 512 may also block requests based on the state of a physical computing resource. This provides redundancy where all user requests are routed through management server 510. However, it also enables the restrictions imposed by the various states to be enforced in embodiments where user requests are routed directly to a physical computing resources instead of being routed through a management server. A gateway may simply delete commands that are disallowed due to a resource's state. A gateway may also respond to the requestor with an error message. The gateway may maintain its own independent database of the state of each physical resource. Alternatively, the gateway may interact with the database of the management server.

FIG. 6 illustrates a method that may be performed by a management server as new physical computing resources are added to a cloud. In step 601, the new resources are identified. The new resources may by identified automatically based on, for example, messages broadcast by the new physical computing resources. Alternatively, the new resources may be identified based on one or more messages received from an administrator of the management server. The new resources may be a single device or a group of devices, such as a cluster, pod, or zone. Either way, the new resources are added to the management server's database of states in step 602. By default, the new physical computing resources are given the disabled state. In step 603, any requests for the new resources are handled in accordance with the database of states. For the disabled state, this means that requests for non-administrators of the management server are not passed to the new resources, but requests from administrators are passed to the new resources. A more detailed example of how this step is performed is described below with respect to FIG. 7. In step 604 a message is received from an administrator indicating a new state for the physical computing resources. The new state may be the enabled state, restricted state, unmanaged state, or any other state supported by the management server. If there are many physical computing resources, the updated state may apply to some, but not all, of the physical computing resources. The database is updated in step 605, and any requests for the new resources are handled in accordance with the updated database of states in step 606, as described below.

FIG. 7 illustrates a method that may be performed by a management server when receiving a request for a cloud resource. In step 701, the request is received. In step 702, the state(s) of physical computing resources in which the request is allowed are identified. For example, a request from a non-administrator to create a new virtual machine may be passed to a physical resource in the enabled state, but not the disabled, restricted, or unmanaged states.

In step 703, all of the physical computing resources that (1) fall within the set of resources identified by the request and (2) are in a state allowed by the request are identified. Continuing the example from above, and assuming the request specified hosts in pod 534, all machines that are in the enabled state in pod 534 are identified in step 703. A request may specify a set of hosts that may service the request implicitly. For example, if a user is only allowed to access the resources in pod 534, then the user's requests are implicitly limited to the hosts in that pod. Conversely, if a zone, pod, or other grouping of resources are reserved for a first user, then requests from a second user are implicitly limited to hosts other than those reserved for the first user.

If no resources are available to service the request, as determined in step 704, then an error message is returned in step 705. In some embodiments, user requests for specific resources may be treated as preferences. In these embodiments, the management server may search a broader set of resources to find a resource that may fulfill the request instead of immediately returning an error message.

If one or more physical computing resources are identified, as determined in step 704, then one of the identified resources is selected in step 706. A request may be passed to the first identified resource, but several other techniques may be used. For example, each of the resources may be compared, and the resource with the best expected performance may be selected. Using hosts as an example, the host with the lowest average processor load, memory usage, or number of virtual machines may be selected. In step 707, the request is sent to the selected resource for fulfillment.

FIG. 8 illustrates a method of automatically changing the state of one or more physical computing resources based on performance information. The method may be performed by, for example, a management server. In step 801, the performance of various physical computing resources is measured. Performance may be measured in a variety of ways. Examples of metrics that may be used include a response time to a request, a processor's average utilization, a storage pool's average bandwidth, a firewall's average number of rules being processed, the number of virtual machines on each host, the percentage of a storage pool's total capacity that is already allocated or in use, etc. For groups of resources, an average of some or all of these measurements may be used across the resources of each group. Other summaries of the group, such as the minimum or maximum performance measurement of the devices in the group, may also be used. Also, several of the metrics may be combined into a composite score. For example, a combined score may be created by adding the number of virtual machines on a host and the host's average memory usage. Alternatively, several of these metrics may be considered individually in steps 803 and 806.

In step 802, it is determined if the measured resource is already in the restricted state. If it is not, then in step 803 it is placed in the restricted state if the performance measurement from step 801 indicates performance below a threshold (step 804), and it is not placed in the restricted state otherwise (step 805).

If a resource is already in the restricted state, then in step 806 it is determined if the performance measurement from step 801 indicated performance above a threshold for leaving the restricted state. If the performance measurement does not exceed the threshold, then the resource's state is not changed (step 805). If it does exceed the threshold, then the resource is returned to its previous state in step 807. In some embodiments, only resources in the enabled state are evaluated using the process described above with respect to FIG. 8. In these embodiments, step 807 may be equivalent to assigning the enabled state to the resource. In some embodiments, the threshold level of performance for entering the restricted state may be greater than the threshold level of performance for leaving the restricted state. This gap may help prevent rapid changes to the state of individual resources. Rapid changes in state may also be limited by, for example, measuring performance at temporally spaced intervals.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the spirit and scope of the following claims.

The invention claimed is:

1. One or more non-transitory computer readable media storing computer-executable instructions that, when executed, cause a system to perform:

receiving, at a management server for a cloud that includes a first group of physical computing resources, a message comprising an indication that a second group of two or more physical computing resources has been connected to the cloud, wherein each physical computing resource in the first group and each physical computing resource in the second group is capable of running an operating system;

assigning, at the management server, a disabled state to the second group of two or more physical computing resources and, responsive to the disabled state being assigned to the second group, the management server allowing access to the second group of two or more physical computing resources only by a predefined set of administrators; and in response to input from an administrator from the predefined set of administrators, assigning an enabled state to the second group of two or more physical computing resources, and, responsive to the enabled state being assigned to the second group, the management server allowing access by additional users to the second group of two or more physical computing resources.

2. The one or more non-transitory computer readable media of claim 1, wherein the instructions also cause the system to perform:

assigning a restricted state to a third group of physical computing resources, and, responsive to the restricted state being assigned to the third group, the management server permitting user access to existing instances of operating systems the third group of physical computing resources and preventing user-directed creation of additional instances of operating systems on the third group of physical computing resources.

3. The one or more non-transitory computer readable media of claim 2, wherein the restricted state is assigned to the third group of physical computing resources in response to:

measuring a performance of the third group of physical computing resources; and determining that the measured performance of the third group of physical computing resources indicates performance that falls below a first threshold.

4. The one or more non-transitory computer readable media of claim 3, wherein the instructions also cause the system to perform:

assigning the enabled state to the third group of physical computing resources responsive to a second measurement of the performance of the third group of physical computing resources indicating performance above a second threshold.

5. The one or more non-transitory computer readable media of claim 4, wherein the second threshold is different from the first threshold.

6. The one or more non-transitory computer readable media of claim 1, wherein the instructions also cause the system to perform:

in response to input from the administrator from the predefined set of administrators, assigning an unmanaged state to a third group of physical computing resources, and, responsive to the unmanaged state being assigned to the third group, the management server prohibiting all communications from the management server to the third group of physical computing resources.

7. The one or more non-transitory computer readable media of claim 6, wherein, responsive to the unmanaged state being assigned to the third group, the management server ignores all communications received from the third group of physical computing resources.

8. The one or more non-transitory computer readable media of claim 1, wherein the instructions also cause the system to perform:

restricting, at a gateway between at least one group of physical computing resources and the management server, communications between the at least one group of physical computing resources and the management server based on a state associated with each physical computing resource in the at least one group of physical computing resources.

9. The one or more non-transitory computer readable media of claim 1, wherein the instructions also cause the system to perform:

receiving, at the management server, a user request to create a new instance of an operating system on one of a plurality of physical computing resources; and selecting, at the management server, one of the plurality of physical computing resources to create the new instance of the operating system, wherein the one of the plurality of physical computing resources was selected based at least in part on the enabled state being assigned to the one of the plurality of physical computing resources.

10. A method comprising:

receiving, at a management server for a cloud that includes a first group of physical computing resources, a message comprising an indication that a second group of two or more physical computing resources has been connected to the cloud, wherein each physical computing resource in the first group and each physical computing resource in the second group is capable of running an operating system;

assigning, at the management server, a disabled state to the second group of two or more physical computing resources and, responsive to the disabled state being assigned to the second group, the management server allowing access to the second group of two or more physical computing resources only by a predefined set of administrators; and in response to input from an administrator from the predefined set of administrators, assigning an enabled state to the second group of two or more physical computing resources, and, responsive to the enabled state being assigned to the second group, the management server allowing access by additional users to the second group of two or more physical computing resources.

11. The method of claim 10, further comprising:

assigning a restricted state to a third group of physical computing resources, and, responsive to the restricted state being assigned to the third group, the management server permitting user access to existing instances of operating systems running on the third group of physical computing resources and preventing user-directed creation of additional instances of operating systems on the third group of physical computing resources.

12. The method of claim 11, wherein the restricted state is assigned to the third group of physical computing resources in response to:

measuring a performance of the third group of physical computing resources; and determining that the measured performance of the third group of physical computing resources indicates performance that falls below a first threshold.

13. The method of claim 12, further comprising:

assigning the enabled state to the third group of physical computing resources responsive to a second measurement of the performance of the third group of physical computing resources indicating performance above a second threshold.

14. The method of claim 13, wherein the second threshold is different from the first threshold.

15. The method of claim 10, further comprising:

in response to input from the administrator from the predefined set of administrators, assigning an unmanaged state to a third group of physical computing resources, and, responsive to the unmanaged state being assigned to the third group, the management server prohibiting all communications from the management server to the third group of physical computing resources.

16. The method of claim 15, wherein, responsive to the unmanaged state being assigned to the third group, the management server ignores all communications received from the third group of physical computing resources.

17. The method of claim 10, further comprising:
restricting, at a gateway between at least one group of physical computing resources and the management server, communications between the at least one group of physical computing resources and the management server based on a state associated with each physical computing resource in the at least one group of physical computing resources.

18. The method of claim 10, further comprising:
receiving, at the management server, a user request to create a new instance of an operating system on one of a plurality of physical computing resources; and
selecting, at the management server, one of the plurality of physical computing resources to create the new instance of the operating system, wherein the one of the plurality of physical computing resources was selected based at least in part on the enabled state being assigned to the one of the plurality of physical computing resources.

19. A system comprising:
a cloud that includes a plurality of computers; and
a management server for the cloud, the management server configured to:
store data defining an organization of the plurality computers into groups of two or more computers;
associate at least one state with each of the groups of two or more computers, wherein each state is selected from a group of states that comprises an enabled state and a restricted state; and
restrict access to the groups of two or more computers based on the states associated with the groups of two or more computers wherein, for each group of two or more computers associated with the enabled stated, the management server is configured to:
permit user access to existing instances of operating systems running on each computer in the group of two or more computers; and
permit user-directed creation of additional instances of operating systems on each computer in the group of two or more the computers; and
wherein, for each group of two or more computers associated with the restricted state, the management server is configured to:
permit user access to existing instances of operating systems running on each computer in the group of two or more computers; and
prevent user-directed creation of additional instances of operating systems on each computer in the group of two or more computers.

20. The system of claim 19, wherein the group of states further comprises a disabled state; and
wherein, for each group of two or more computers associated with the disabled state, the management server is configured to:
prevent user access to existing instances of operating systems running on each computer in the group of two or more computers; and
permit only administrators of the management server to send communications to each computer in the group of two or more computers.

* * * * *